United States Patent
Diaz Cervera et al.

(10) Patent No.: US 7,742,739 B2
(45) Date of Patent: Jun. 22, 2010

(54) AIR INTERFACE PROTOCOLS FOR A RADIO ACCESS NETWORK WITH AD-HOC EXTENSIONS

(75) Inventors: José Diaz Cervera, Valencia (ES); Rolf Sigle, Remshalden (DE)

(73) Assignee: Alcatel, Paris (FR)

( * ) Notice: Subject to any disclaimer, the term of this patent is extended or adjusted under 35 U.S.C. 154(b) by 1358 days.

(21) Appl. No.: 11/147,157

(22) Filed: Jun. 8, 2005

(65) Prior Publication Data
US 2006/0003696 A1 Jan. 5, 2006

(30) Foreign Application Priority Data
Jun. 30, 2004 (EP) .................................. 04291664

(51) Int. Cl.
*H04Q 7/20* (2006.01)

(52) U.S. Cl. ........................ 455/11.1; 455/7; 455/426.1; 455/426.2; 455/552.1; 455/403; 370/315; 370/338; 370/310; 375/211

(58) Field of Classification Search ................ 455/11.1, 455/426.1, 426.2, 403, 422.1, 445, 550.1, 455/500, 517, 7, 466, 412.1, 412.2, 414.1–414.4, 455/515, 514, 516; 370/315–326, 310; 375/211
See application file for complete search history.

(56) References Cited

U.S. PATENT DOCUMENTS

| | | | |
|---|---|---|---|
| 6,735,417 B2 * | 5/2004 | Fonseca et al. ............. | 455/11.1 |
| 2001/0018336 A1 * | 8/2001 | Okajima et al. ............. | 455/403 |
| 2001/0047474 A1 | 11/2001 | Takagi et al. | |
| 2004/0005861 A1 | 1/2004 | Tauchi | |
| 2005/0025182 A1 * | 2/2005 | Nazari ........................ | 370/469 |

\* cited by examiner

*Primary Examiner*—Keith T Ferguson
(74) *Attorney, Agent, or Firm*—Sughrue Mion, PLLC (57) ABSTRACT

To reduce the overhead induced by transmitting data between a mobile client and a cellular network via an ad-hoc network extension, the cellular network transmits data dedicated to the mobile relay and dedicated to the mobile client within the same data stream, the mobile relay detects whether data received by the mobile relay contains data that are dedicated to the mobile relay itself and terminates the part of the received data that is dedicated to the mobile relay itself, the mobile relay detects whether data received by the mobile relay contains data that are dedicated to the mobile client and forwards the part that is dedicated to the mobile client to the mobile client, and the mobile relay detects whether data received by the mobile relay contains data that are dedicated to the cellular network and forwards the part that is dedicated to the cellular network to the cellular network.

31 Claims, 3 Drawing Sheets

AIR INTERFACE PROTOCOLS FOR A RADIO ACCESS NETWORK WITH AD-HOC EXTENSIONS

BACKGROUND OF THE INVENTION

The invention is based on a priority application EP04291664.3 which is hereby incorporated by reference.

The present invention relates to a method for transmitting data between a mobile client and a cellular network, wherein the mobile client is connected to an ad-hoc network and communicates via the ad-hoc network with a mobile relay that is connected to the ad-hoc network and the cellular network and wherein the mobile relay relays data that are transmitted from the mobile client to the cellular network and/or data that are transmitted from the cellular network to the mobile client.

The invention also relates to a mobile relay for relaying data that are transmitted from a mobile client to a cellular network and/or for relaying data that are transmitted from a cellular network to a mobile client wherein the mobile client is connected to the ad-hoc network and the mobile relay is connected to the ad-hoc network and to the cellular network.

The invention furthermore relates to a mobile client connected to an ad-hoc network and to a radio access network that is part of a cellular network and adapted to transmit signaling, data dedicated to a mobile relay, and data dedicated to a mobile client, wherein the radio access network comprises a radio access network protocol stack and wherein the radio access network protocol stack comprises a set of lower layers and a set of higher layers.

The invention at least relates to a telecommunications system comprising a cellular network, an ad-hoc network, a mobile client and a mobile relay wherein the mobile client is connected to an ad-hoc network and comprises means for communicating with the mobile relay via the ad-hoc network, and wherein the mobile relay is connected to the ad-hoc network and the cellular network and comprises means to relay data that are transmitted from the mobile client to the cellular network and/or data that are transmitted from the cellular network to the mobile client.

Cellular networks are widely used for enabling communication between a mobile terminal and another mobile terminal or between a mobile terminal and a terminal that is connected to a terrestrial network, e.g. the public switched telephone network (PSTN), the integrated services data network (ISDN) or the internet. It is also possible for a mobile terminal to access different services offered directly by a cellular network operator to its subscribers (e.g. the mobile terminals), based on different service platforms located in the Core Network.

A cellular network consists of different network elements such as a Core Network (CN), a Radio Access Network (RAN), and a mobile terminal (also called User Equipment, UE) e.g. a mobile telephone. Examples of cellular networks are GSM (Global System for Mobile communications) and UMTS (Universal Mobile Telecommunications System). In the remaining text the terminology according to the UMTS standard is used.

The Radio Access Network (RAN) is composed of a collection of Radio Network Subsystems (RNS). Each RNS includes a Radio Network Controller (RNC) and several Node Bs that are attached to and controlled by the RNC.

The Node B is a physical unit for radio transmission (and reception) and is attached to one or more cells. The main task of the Node B is the conversion of data transmitted to and from the mobile terminal. In addition, the Node B measures the quality and strength of the connection to the mobile terminal.

The RNC is responsible for the control of its associated Node Bs. Thus, it is in charge of the management of resources in those Node Bs and in the cells to which these Node Bs are attached.

The different elements of the RAN are interconnected with each other and towards the Core Network by means of a transmission network, which is usually a terrestrial network. Consequently, the RAN is named UTRAN (UMTS Terrestrial Radio Access Network). In UTRAN, the transmission network can be based on ATM or IP transport. Initial releases of the UMTS standard were only allowed for the use of ATM, but IP transport was introduced as an option in Release 5.

Several logical interfaces have been defined for the interconnection of different types of network elements across the transmission network. In particular, the communication between an RNC and any of the Node Bs belonging to the same RNS takes place across the so-called Iub interface. Moreover, different RNCs (belonging to different RNSs) may communicate with each other using the so-called Iur interface. Finally, the communication between an RNC and the Core Network (and hence between RAN and CN) takes place across a so-called Iu interface.

In UTRAN, the RNC may play several roles with respect to the different Node Bs and terminals. In each RNS, there is a single RNC, which is responsible for the control of all Node Bs in the RNS and their associated resources. In this case, the RNC acts as a Controlling RNC (CRNC) for the Node Bs in the RNS. In addition to the control of Node Bs, the RNC is also responsible for controlling the connection of the mobile terminals to the cellular network. The RNC in charge of a particular user connection acts as a Serving RNC (SRNC) for the user.

A mobile terminal accesses the cellular network via one or several radio links which are accessible through a so called air interface. Data transmitted from the mobile terminal are carried over the air interface to one or several Node Bs. Each Node B transmits the data received from the mobile terminal together with measurement results to the associated Controlling RNC, via the Iub interface.

The Controlling RNC for a Node B through which the mobile terminal is accessing the network may also be the Serving RNC for the mobile terminal or a different RNC. In the latter case, the Controlling RNC for the Node B plays also the role of a Drift RNC with respect to the user connection, because data must be forwarded ("drifted") via the Iur interface by this RNC to the Serving RNC responsible for the control of the user connection.

In UMTS the Core Network consists of a circuit-switched part (CS domain) and a packet-switched part (PS domain). Each of them is composed of several elements. One major element in the CS domain is the Mobile Switching Center (MSC), responsible e.g. for switching and signaling functions for mobile terminals, including support of user mobility through handover and location update procedures. Moreover, access to external circuit-switched networks may be provided through a so called Gateway MSC. The MSC communicates with a Home Location Register (HLR) and a Visitor Location Register (VLR) which are databases storing permanent subscriber information and temporary user location information, respectively.

In the PS domain, a Serving GPRS Support Node (SGSN) can be considered as the counterpart of the MSC. The SGSN is responsible for managing the packet-switched related communications within the CN. The SGSN communicates with a Gateway GPRS Support Node (GGSN), which provides access to an external packet-switched network such as the Internet. A network address is assigned to each mobile terminal by the GGSN. This network address is valid in the external packet-switched network. This allows the mobile terminal to communicate with other terminals or servers in the external network.

Data that originate from the mobile terminal are transmitted through the Core Network (CN) to the receiver. This is for example a terminal connected to an external circuit-switched network such as the ISDN, an external packet-switched network like the Internet or another mobile terminal. If the receiver is another mobile terminal the data are transmitted from the CN to this mobile terminal via its associated Serving RNC and the Node B that controls the cell in which the other mobile terminal is located or the Node Bs responsible for those cells in which the terminal has an active radio link, in case of soft handover (described later in this document).

The transmission of data described so far relates mainly to user data, e.g. voice related data, that are dedicated to a specific receiver. Besides this user data, within a cellular network several control information have to be transmitted to make sure the cellular network operates properly. This control information is called signaling. Signaling related data deal with subjects like handover control (including macro diversity), power control, exchange of measurements between network and terminals, mobility and location management.

A mobile terminal can be connected to several cells simultaneously. This option is called macro diversity. The set of cells the mobile terminal is connected to simultaneously is called the active set of the mobile terminal. The data streams received via the different cells of the active set are combined by the Node B (in case of softer handover, i.e. several cells in the active set belong to the same Node B) or by the RNC (in case of soft handover, i.e. cells in the active set belong to different Node Bs). The mobile terminal measures the signal levels of these cells and reports the measurement results via the controlling Node Bs to the RNC. The RNC evaluates the reported data and causes the mobile terminal to change the set of active cells if necessary.

Soft handover involves the addition of a new radio link through another Node B in case of transmission quality deterioration to improve transmission quality (e.g. by reducing the error frame rates) and to improve the rate of high quality active connections in one cell.

Since the same frequencies are used in an active cell and in the adjacent cells, there exists the risk of interference. Thus, power control is an important issue. Different power control techniques exist in UMTS, e.g. open-loop power control and closed loop power control. According to open loop power control, the Node B broadcasts information about the minimum power needed to enable a mobile terminal to gain access to the cellular network. According to the closed loop power control, the Node B transmits information to the mobile terminal to adjust the transmission power, according e.g. to a signal-to-interference ratio. The closed loop power control is a kind of dedicated signaling, since those information are not sent to all mobile terminals that reside in a cell (via broadcasting) but is dedicated to one specific mobile terminal.

The UMTS radio interface protocol stack comprises a physical layer, several L2 (layer 2) protocols, and different L3 (layer 3) protocols used for the exchange of signaling between the cellular network and the terminals. From the lowest to the highest layer, L2 protocols include the following layers: MAC (Medium Access Control), RLC (Radio Link Control), BMC (Broadcast/Multicast Control, used only for Cell Broadcast Services) and PDCP (Packet Data Convergence Protocol, used only for packet-switched services).

Some of the L3 protocols used for signaling exchange are terminated in the Core Network, and only the RRC (Radio Resource Control) protocol is terminated in the RAN. The RRC protocol is responsible for all signaling related to the usage of a radio interface to gain access to the cellular network.

Data transferred within UMTS can be divided into two groups. These are represented by control channels for transmitting signaling related data and traffic channels for transmitting user data. Examples for control channels and traffic channels are

- the Broadcast Control Channel (BCCH): Broadcast of system information, i.e. information related to the radio environment like code values in the cell and in the adjacent cells, power levels, etc.
- the Paging Control Channel (PCH): Paging is performed in order to find out the actual location of the user and to notify the user of the arrival of an incoming call.
- the Common Control Channel (CCCH): Used for tasks common for all mobile terminals residing in the cell, for instance the initial access procedures. Since many users may use the CCCH simultaneously they are identified by unique identity (IMSI, International Mobile Subscriber Identifier, or U-RNTI, UTRAN Radio Network Temporary Identity).
- the Dedicated Control Channel (DCCH): Control information of dedicated and active connection, used for instance for handover control and measurement exchange.
- Dedicated Traffic Channel (DTCH): Channel for the transmission of dedicated user traffic (user data), e.g. voice data.
- Common Traffic Channel (CTCH): Information that is to be send to all mobile terminals or a specific group of mobile terminals in the cell. This channel is mainly used for Cell Broadcast Services, which consist in the delivery of short text messages to all users or to the subscribed users in a cell (e.g. for short news services).

The channels described so far are called logical channels, which can be considered as transmission services offered by the MAC layer to higher sublayers.

Logical channels are mapped to transport channels by the MAC sublayer, which may also multiplex several logical channels into the same transport channel. Transport channels are bearer services (i.e. transmission services) offered by the physical layer of the air interface.

The physical layer maps transport channels to physical channels. Physical channels correspond to the actual radio channels used for the communication across the radio interface. In addition to mapping transport channels to physical channels, the physical layer can also multiplex several transport channels onto a Coded Composite Transport Channel (CCTrCH), which is then mapped to one physical channel or more than one physical channel (in case the maximum data rate which can be offered by a single physical channel is lower than the joint data rate of the CCTrCH).

For extending a cellular network an ad-hoc network can be used. With an ad-hoc network extension a mobile terminal (here: mobile client) that is connected to the ad-hoc network communicates with the cellular network not directly but via another mobile terminal (here: mobile relay). The mobile relay is connected to the ad-hoc network and to the cellular network. Data that are transmitted from the mobile client and are dedicated to the cellular network are first transmitted from the mobile client to the mobile relay using the ad-hoc network. The mobile relay then relays these data by forwarding it to the cellular network. Examples of an ad-hoc network are WLAN (wireless local area network) and Bluetooth.

Extending a cellular network by an ad-hoc network can result in an improvement of cell capacity and coverage. If, for example, a mobile terminal is placed far away (in terms of reception level, and not necessarily physical distance) from a Node B that is in the active set of the mobile terminal, it transmits data with a very high transmission power. This in turn can interfere with other data transmissions in the same or adjacent cells. Using an ad-hoc network extension and having a mobile relay within reach of the mobile terminal, the mobile relay can connect to a Node B with a higher quality and lower power transmission than the mobile terminal. Thus the coverage can be raised and the risk of interference with other connections will be reduced. Since one mobile relay can in principle relay the data transmitted from different mobile terminals at a given time, the coverage can be increased further on.

The communication between the mobile relay and the mobile client can also be realized across a number of intermediate so called ad-hoc terminals such that the data that are transmitted from the mobile terminal and that are dedicated to the cellular network (or vice versa) are forwarded several times by intermediate ad-hoc terminals between the mobile client and the mobile relay. This is called a multi-hop ad-hoc connection.

Transmitting data between a mobile client and a cellular network via an ad-hoc extension induces an overhead since it requires several steps of processing and/or converting these data. This usually is a computing-time consuming task which is at least at the expense of computing power in one of the elements involved in the transmission of data.

For each communication connection via the ad-hoc network at least two mobile terminals are involved, namely the mobile client which communicates indirectly with the cellular network and a mobile relay that communicates directly with the cellular network. This means, that at least control data for both—the mobile relay that communicates directly with the cellular network and the mobile client—have to be transferred via the cellular network. This induces a further overhead since for just one communication connection at least two sets of control data have to be generated, transferred via the cellular network, and processed.

SUMMARY OF THE INVENTION

It is therefore an object of the invention to reduce the overhead induced by transmitting data between a mobile client and a cellular network via an ad-hoc network extension.

According to the present invention this object is solved by a method for transmitting data between a mobile client and a cellular network of the above-mentioned kind, wherein the cellular network transmits data dedicated to the mobile relay and dedicated to the mobile client within the same data stream;

the mobile relay detects whether data received by the mobile relay contains data that are dedicated to the mobile relay itself and terminates the part of the received data that is dedicated to the mobile relay itself;

the mobile relay detects whether data received by the mobile relay contains data that are dedicated to the mobile client and forwards the part that is dedicated to the mobile client to the mobile client; and the mobile relay detects whether data received by the mobile relay contains data that are dedicated to the cellular network and forwards the part that is dedicated to the cellular network to the cellular network.

The invention suggests to transmit data dedicated to the mobile relay together with the data dedicated to the mobile client within the same data stream. This can for example be obtained by sending both data within the same transport channel (e.g. Dedicated Channel, DCH) or within the same physical channel, e.g. DPDCH (Dedicated Physical Data Channel)/DPCCH (Dedicated Physical Control Channel).

If the mobile relay receives data from the cellular network it detects whether these data contain data that are dedicated to the mobile relay itself. These data could be for example signaling data related to power control, handover, etc. If the mobile relay detects such data, it terminates this part of the received data. This means, that the mobile relay will process this data and will not transmit the data to the mobile client. The mobile relay also detects whether received data contain data that are dedicated to the mobile client. If the mobile relay detects such data, it forwards these data to the mobile client.

Data that are transmitted from the mobile client to the cellular network via the mobile relay, are examined by the mobile relay to detect whether these data contain data that are dedicated to the cellular network. If the mobile relay detects such data, they are forwarded to the cellular network. It is possible, that the data that are relayed by the mobile relay and originate from the mobile client are sent within a data stream together with the data that originate from the mobile relay and are dedicated to the cellular network. This could also include user related data sent from the mobile relay to the cellular network while the mobile relay itself acts as a mobile terminal.

Since the data that are dedicated to the mobile relay and the data that are dedicated to the mobile client are both transmitted within the same data stream, the overhead induced by the ad-hoc network extension is reduced significantly.

According to a preferred embodiment of the present invention—wherein the mobile relay comprises a first protocol stack and a second protocol stack, each of them comprising a set of lower layers and a set of higher layers—it is suggested that the data transmitted between the mobile client and the mobile relay are processed by at least one layer of the first protocol stack of the mobile relay. The data transmitted between the mobile relay and the cellular network are processed by at least one layer of the second protocol stack of the mobile relay. The detection whether data received by the mobile relay are dedicated to the mobile relay itself or are dedicated to the mobile client is performed by at least one lower layer of the second protocol stack.

According to the present invention the term "set" is used in its mathematical sense which means, that it may contain one, more, or no element at all.

Within a protocol stack, each layer usually provides services for higher layers and utilizes services provided by lower layers. So a protocol stack is organized hierarchically and data flow within the protocol stack is from the lowest layer to the highest layer and vice versa. Each layer within the flow of data processes the data it receives and transfers the processed data to the next layer which means that each layer consumes computing time. Performing the detection whether received data is dedicated to the mobile client or the mobile relay in a lower layer reduces the consumption of computing time and thus again reduces the overhead induced by relaying the data transmitted between the mobile client and the cellular network again.

Detection in lower layers may be based on the usage of certain identifiers, which are previously defined to indicate, whether data and/or signaling is dedicated to the cellular network, the mobile client, or the mobile relay. The definitions of these identifiers can be exchanged during the initial setup of the communication through the exchange of signaling between the involved parties.

To reduce the overhead once more, it is further suggested, that the detection whether data received by the mobile relay are dedicated to the mobile relay itself or are dedicated to the cellular network is performed by at least one lower layer of the first protocol stack.

Again, this detection can be based on the usage of certain identifiers, previously defined and exchanged during the initial setup by means of signaling.

Preferably, the termination of the data that are transmitted from the cellular network to the mobile relay and are dedicated to the mobile relay itself is performed by at least one higher layer of the second protocol stack of the mobile relay. Furthermore, the termination of the data that are transmitted from the mobile client to the mobile relay and are dedicated to the mobile relay itself is performed by at least one higher layer of the first protocol stack of the mobile relay.

Data that are dedicated to the mobile relay are for example signaling related data. According to this embodiment of the invention the data that are detected by the lower layer of a protocol stack and are dedicated to the mobile relay itself are directly and without any conversion passed to and processed in the higher layers of the protocol stack. This reduces the overhead once more and enables a very efficient implementation of the second protocol stack by using a slightly modified version of the protocol stack that is used by any ordinary mobile terminal that communicates directly with the cellular network.

It is suggested that the data that are transmitted from the cellular network to the mobile relay and have to be forwarded by the mobile relay to the mobile client are transferred from at least one lower layer of the second protocol stack to at least one lower layer of the first protocol stack. It is further suggested that the data that are transmitted from the mobile client to the mobile relay and are to be forwarded to the cellular network are transferred from at least one lower layer of the first protocol stack to at least one lower layer of the second protocol stack. This means that data that are received e.g. by the second protocol stack and are not dedicated to the mobile relay itself will be passed to the first protocol stack immediately after the detection that these data are not dedicated to the mobile relay itself. In particular, no further processing of this data in any layer of the second protocol stack is performed. The same holds, if data dedicated to the cellular network are received and detected by the first protocol stack.

In another preferred embodiment the set of lower layers and the set of higher layers of the first protocol stack of the mobile relay and/or the set of lower layers and the set of higher layers of the second protocol stack are separated by a predefined barrier. This barrier has to be defined such that it is located within the protocol stack as low as possible to minimize the overhead.

Preferably, the mobile client comprises at least a first protocol stack comprising a set of lower layers and a set of higher layers. The signaling between the mobile relay and the mobile client is performed by at least one higher level of the first protocol stack of the mobile client and at least one higher level of the first protocol stack of the mobile relay. The signaling between the mobile client and the mobile relay includes signaling information that is transmitted from the cellular network. This kind of signaling relates for example to control information regarding the availability of services. Signaling information could be transmitted exclusively dedicated to the mobile client (e.g. via DCCH) but also more general by broadcasting it (e.g. via BCCH).

In another preferred embodiment of the invention a ciphering of data that are transmitted from the mobile client to the cellular network is performed by at least a higher level of the second protocol stack of the mobile client. Ciphered data that are received by the mobile relay from the mobile client are transferred from a lower layer of the first protocol stack of the mobile relay to a lower layer of the second protocol stack of the mobile relay. This is a major aspect of the present invention since this embodiment enables the transmission of ciphered data from the mobile client to the cellular network without the need of deciphering the data by the mobile relay which otherwise would cause a security risk.

It is also suggested, that ciphered data that are received by the mobile relay from the cellular network and are dedicated to the mobile client are transferred from a lower layer of the second protocol stack of the mobile relay to a lower layer of the first protocol stack of the mobile relay. A deciphering of ciphered data that are transmitted from the cellular network to the mobile client via the mobile relay is performed by a higher level of the second protocol stack of the mobile client.

In UMTS, ciphering is performed by different layers of the air interface protocol stack. In particular, the layers responsible for ciphering are the RLC layer or the MAC-d sublayer, depending on the RLC mode used for data transmission.

The RLC layer has three modes of operation, named Acknowledged Mode (AM), Unacknowledged Mode (UM) and Transparent Mode (TM). Packet-switched services make normally use of AM or UM, depending on whether reliable delivery is required or not. In both cases, ciphering is performed by the RLC layer. Circuit-switched services use normally TM, and in this latter case ciphering is performed by the MAC-d sublayer.

In the UMTS radio interface protocol architecture, logical channels are defined as transmission services between the MAC and RLC layers, and transport channels are defined as transmission services between the physical and MAC layers.

For PS-services, ciphering is carried out in the RLC layer, and it is hence different for each logical channel. As a result, data dedicated to the mobile client and data dedicated to the mobile relay must be sent through different logical channels. However, it is possible to send data dedicated to the mobile relay together with data dedicated to the mobile client or the cellular network within the same transport channel or physical channel.

For CS-services, ciphering is carried out in the MAC-d sublayer. Consequently, each transport channel uses a different ciphering scheme and it is no longer possible to send data dedicated to the mobile relay together with data dedicated to the mobile client or the cellular network within the same transport channel. However, it is still possible to send these data on the same physical channel.

In addition to the RLC layer and MAC-d sublayer, which are responsible for ciphering among other functions, higher layers of the second protocol stack of the mobile client may also include other higher protocols of the UMTS air interface protocol stack, for instance PDCP (Packet Data Convergence Protocol) or RRC (Radio Resource Control).

The object of the present invention is also solved by a mobile terminal as mentioned above according to one of the claims 10 to 16.

Furthermore, the object of the present invention is solved by a mobile client as mentioned above according to one of the claims 17 to 23.

Besides, the object of the present invention is solved by a RAN as mentioned above according to claim 24.

Moreover, the object of the present invention is solved by a telecommunications system as mentioned above according to one of the claims 25 to 29.

BRIEF DESCRIPTION OF THE DRAWINGS

Further features and advantages of the present invention are explained in more detail below with reference to the accompanying drawings. The figures show.

Figure 1:
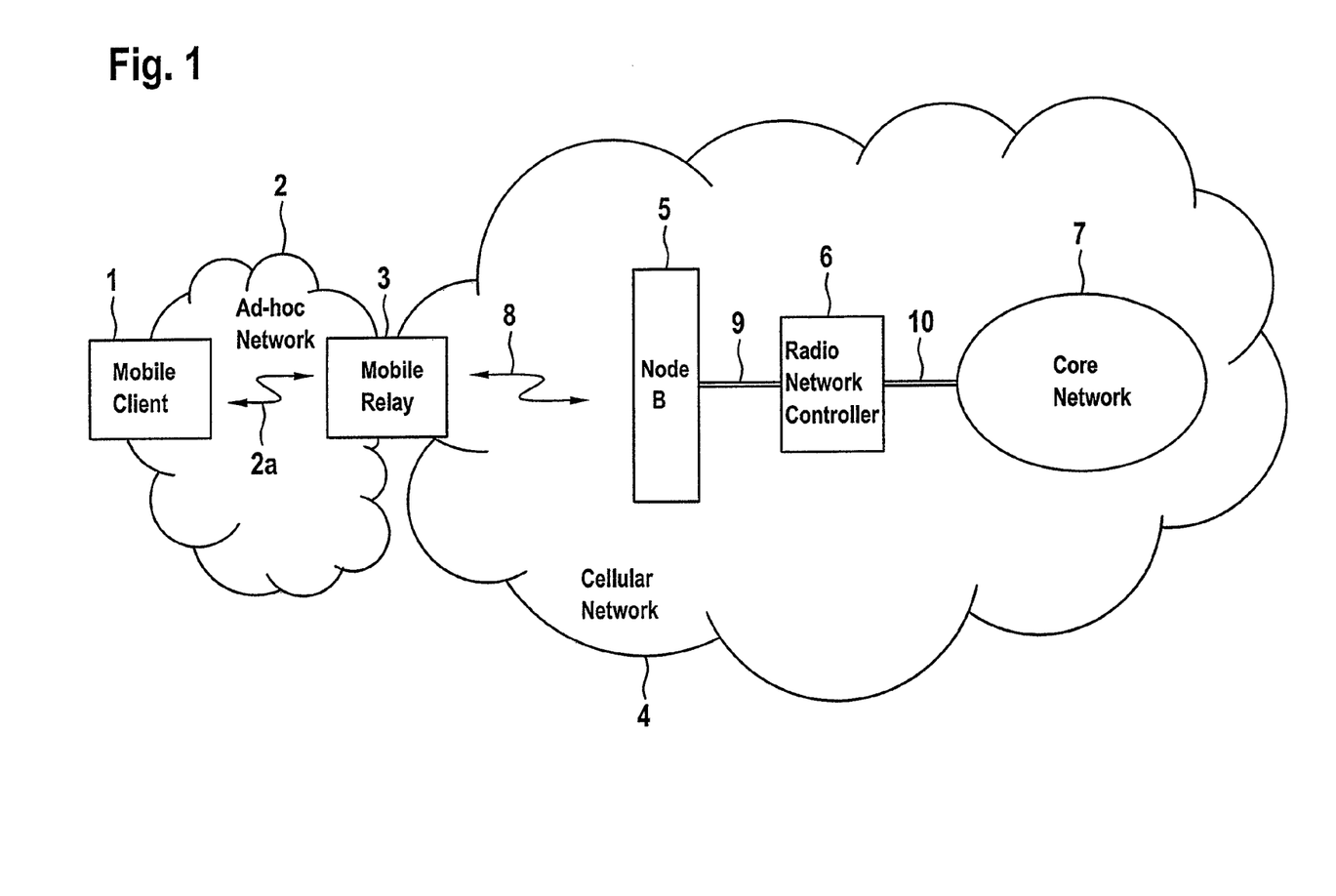
FIG. 1 a general view of a cellular network extended by an ad-hoc network.

FIG. 1 shows a mobile client 1 that communicates via an ad-hoc network 2 with a mobile relay 3 by using an ad-hoc network interface 2a. The mobile relay 3 is connected to a cellular network 4, e.g. a UMTS cellular network. The cellular network 4 includes a Node B 5, a Radio Network Controller (RNC) 6 and a Core Network 7.

The Node B 5 is a physical unit for radio transmission (and reception) and is attached to one or more cells of the cellular network 4 network.

Typically, several Node Bs 5 are associated with one RNC 6 and are controlled by this RNC 6. Particularly, the control includes the management of resources in the Node Bs 5.

The mobile relay 3 communicates with at least one Node B 5 via a radio link that is accessible via an air interface 8 (e.g. Uu in UMTS), although it is also possible to communicate with several Node Bs in parallel (in case of soft handover). The Node B 5 communicates with the RNC 6 via a so-called Iub interface 9, making use of an underlying transmission network, which is usually a terrestrial network. The Node B 5 is controlled by the RNC 6. Both are part of the Radio Access Network (RAN). In UTRAN (the RAN of the UMTS cellular network) the transmission network can be based on ATM or IP transport.

Finally, the communication between an RNC 6 and the Core Network 7 (and hence between RAN and CN) takes place across a so-called Iu interface 10, which makes use of an underlying ATM-based or IP-based backbone.

Figure 2:
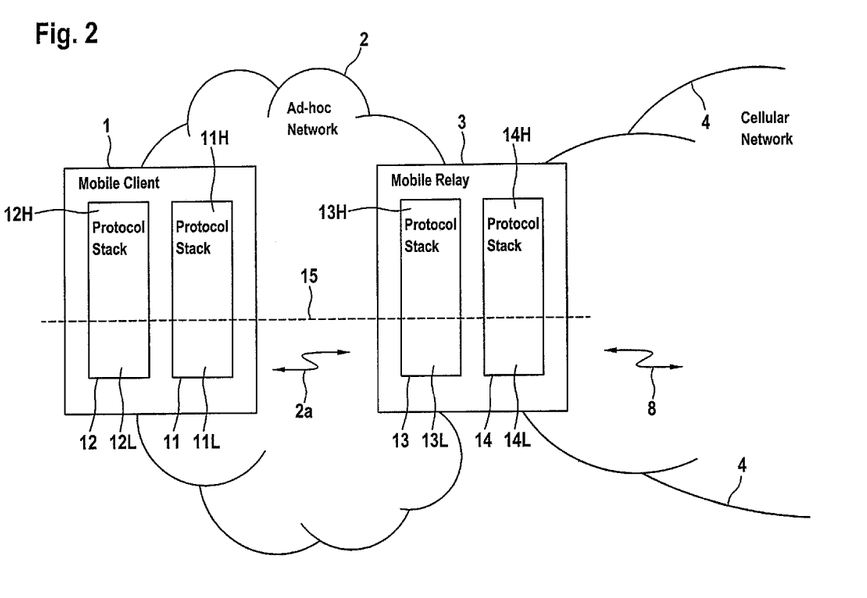
FIG. 2 a general view of the protocol stacks of the mobile relay and the mobile client that are subdivided by a boundary.

FIG. 2 shows the mobile client 1 and the mobile relay 3. The mobile client 1 includes a first protocol stack 11 and a second protocol stack 12. The mobile relay 3 includes a first protocol stack 13 and a second protocol stack 14. Each protocol stack 11, 12, 13, 14 is subdivided by a boundary 15 into a set of lower layers 11L, 12L, 13L, 14L and a set of higher layers 11H, 12H, 13H, 14H.

Figure 3:
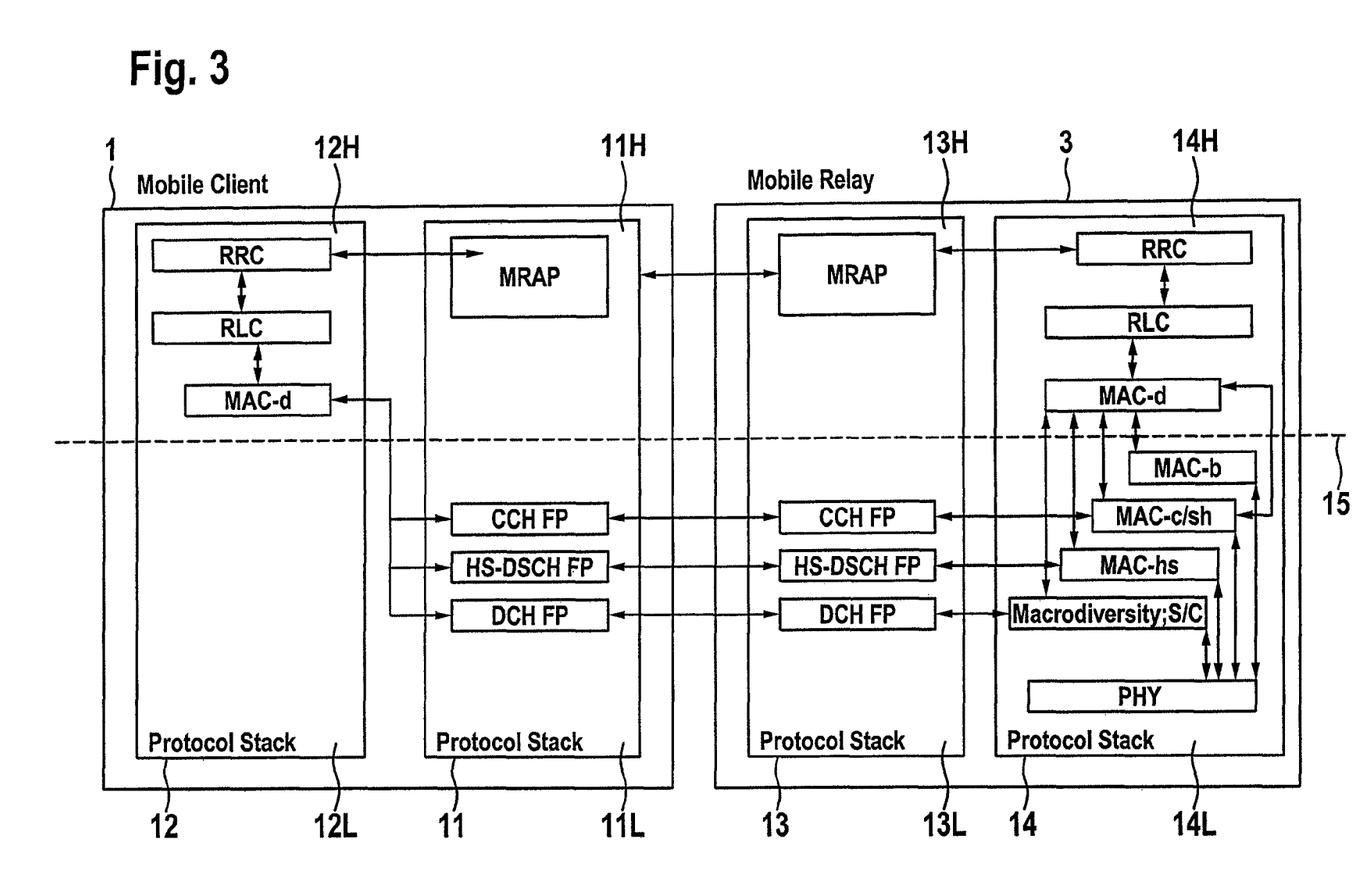
FIG. 3 the protocol stacks of the mobile relay and the mobile client in an embodiment of the invention that is adapted to work with the UMTS cellular network.

FIG. 3 gives an example of an embodiment of the invention wherein the layers of the set of lower layers 11L, 12L, 13L, 14L and the set of higher layers 11H, 12H, 13H, 14H of the protocol stacks 11, 12, 13, 14 are predominantly named according to the UMTS-standard. Instead of showing all layers that may be required in an implementation of the invention, FIG. 3 shows just these layers that illustrate the principal idea of the present invention.

The set of higher layers 11H, of the first protocol stack 11 of the mobile client 1 and the set of higher layers 13H, of the first protocol stack 13 of the mobile relay 3 both comprise a MRAP (Mobile Relay Application Part) which is a signaling protocol that handles signaling between the mobile relay and the mobile client. Among other types of information, the MRAP can also relay part of the RRC signaling that is generated or processed in the mobile client 1 and sent via common control channels and/or via dedicated control channels (e.g. DCCH of the mobile relay 3), in case the associated channels are terminated in the mobile relay 3. The information between the MRAP layer of the first protocol stacks 11 of the mobile client 1 and the MRAP layer of the first protocol stacks 13 of the mobile relay 3 can be exchanged via the ad-hoc network 2 by using e.g. a reliable transport protocol such as TCP (Transmission Control Protocol). For the transmission across the ad-hoc network, standard protocols can be used. These are in particular the layer 2 and layer 1 protocols of the specific ad-hoc technology used in the ad-hoc network (e.g. WLAN or Bluetooth).

The set of higher layers 12H, of the second protocol stack 12 of the mobile client 1 and the set of higher layers 14H, of the second protocol stack 14 of the mobile relay 3 as shown in FIG. 3 both comprise the following layers:

RRC (Radio Resource Control): Generates and processes signaling between the mobile client 1 and the cellular network 4 and signaling between the mobile relay 3 and the cellular network 4. In the cellular network 4, signaling is generated and processed through a RRC-layer of a protocol stack of the RNC 6. Tasks of RRC include for instance establishing and closing a RRC connection, performing measurements (mobile client 1, mobile relay 3) and processing of results of the measurements (Node B 5, RNC 6).

RLC (Radio Link Control): According to UMTS, RLC provides three different modes for data transfer (transparent mode, unacknowledged mode, acknowledged mode) and deals with error identification and correction. If RLC is configured by the RRC to work in unacknowledged mode or in acknowledged mode, the RLC also performs ciphering of data.

MAC-d (Media Access Control dedicated): Controls and handles dedicated channels. The MAC-d layer also performs ciphering in case that the RLC works in transparent mode.

Both, RLC and MAC-d provide a ciphering functionality. Due to security reasons it is not wanted, that the mobile relay 3 deciphers data, that are ciphered by the mobile client 1 and sent to the cellular network 4 or vice versa. Thus, RLC and MAC-d reside in the set of higher layers 12H of the second protocol stack 12 of the mobile client 1. Ciphered data, that are received by the mobile relay 3 and are to be relayed either to the mobile client 1 or to the cellular network 4 are not deciphered by the mobile relay 3 but are transferred from at least one lower layer of the first protocol stack 13 to at least one lower layer of the second protocol stack 14 and vice versa.

As mentioned above, the second protocol stack 14 of the mobile relay 3 is used for communication with the cellular network 4. Thus, basically the second protocol stack 14 comprises the protocol layers that are used in a mobile terminal that is configured to directly communicate with the cellular network. Related to the invention, some of the layers of the second protocol stack 14 provide an increased functionality, e.g. to detect, whether data, received by the mobile relay 3 from the cellular network 4 are dedicated to the mobile relay 3 itself or whether the data have to be forwarded to the mobile client 1.

The main function of the MAC-layer is to control the access to resources offered by the Physical Layer (PHY), in particular to determine how much data must be transmitted from each different data or signaling flow and at which time. The MAC layer is responsible for scheduling of transport blocks, i.e. to deliver in a synchronous manner data blocks towards the Physical Layer. Moreover, the MAC-layer within UMTS deals with mapping and multiplexing logical channels onto transport channels. Therefore, the Mac-layer is subdivided in several sublayers.

The set of lower layers 14L as shown in FIG. 3 comprise the following layers:

MAC-b (Medium Access Control broadcast): Deals with the Broadcast Channels (BCH).

MAC-c/sh (Medium Access Control common/shared): Deals with Common and Shared Channels (CCH). These include a Paging Channel (PCH), a Forward Link Access Channel (FACH), a Random Access Channel (RACH) and optionally a Common Packet Channel (CPCH) and a Downlink Shared Channel (DSCH)

MAC-hs (Medium Access high speed): Deals with high speed data transmission, in particular with a High Speed Downlink Shared Channel (HS-DSCH).

Macrodiversity; S/C (Macrodiversity; Splitting/Combining): Deals with the splitting and combining of data streams in case of macrodiversity, i.e. soft handover (e.g. in case that the mobile relay 3 is connected to several cells associated with different Node Bs 5) and/or softer handover (e.g. in case that the mobile relay 3 is connected to several cells associated with the same Node B 5).

The set of lower layers 11L of the first protocol stack 11 of the mobile client 1 and the set of lower layers 13L of the first protocol stack 13 of the mobile relay 3 both comprise frame protocols (FP) of the ad-hoc network 2 for transmitting data between the mobile client 1 and the mobile relay 3 via the ad-hoc network 2. In particular, these frame protocols deal with data, that have to be relayed by the mobile relay 3 and are transmitted via the HS-DSCH (High Speed Physical Downlink Shared Channel), the DCH (Dedicated Control Channel), and the DSCH (Downlink Shared Channel). The corresponding frame protocols as shown in FIG. 3 are CCH FP, HS-DSCH FP, and DCH FP. The different frame protocols act as adaptation layers above the standard ad-hoc network protocols, in particular the layer 2 and layer 1 protocols of the particular ad-hoc technology (e.g. WLAN or Bluetooth) used in the ad-hoc network.

In the following, the data flow between the mobile client 1 and the cellular network 4 via the mobile relay 3 is described exemplarily by a variety of different data:

Signalling Between Mobile Client 1 and Mobile Relay 3:

Signalling between the mobile client 1 and the mobile relay 2 that is specific to the ad-hoc network 2 is handled through the MRAP. Data related to this kind of signaling are generated by the mobile client 1, transmitted to the mobile relay 3, and terminated in the MRAP of the mobile relay 3 or vice versa.

RRC Messages Between Mobile Client 1 and Cellular Network 4:

RRC messages include information that is transmitted from the RNC to each mobile terminal in a cell via a common channel e.g. to inform the mobile terminals about codes used in the cell and in neighboring cells. RRC messages also include measurements performed by the mobile client 1.

RRC messages that originate in the mobile client 1 can be transferred from the RRC-layer of the second protocol stack 12 to the MRAP of the first protocol stack 11. RRC messages are then encapsulated within MRAP messages and transmitted across the ad-hoc network 2 to the mobile relay 3 using underlying protocols which are specific of the ad-hoc technology.

In the mobile relay 3, the MRAP messages used for the transport of RRC messages from the mobile client 1 are received by the MRAP of the first protocol stack 13, which deencapsulates RRC messages and transfers them to the RRC-layer of the second protocol stack 14. Within the second protocol stack 14, the RRC messages are passed down to the Physical layer (PHY) and are transmitted via the air interface of the cellular network 4 towards the Node B 5 that is attached to the cell in which the mobile relay 3 currently resides. The Node B 5 processes these message or part of the messages and/or forwards the message to the RNC 6 via the transmission network 9.

RRC messages, that are transmitted from the cellular network 4 towards the mobile client 1 are first transmitted from the cellular network 4 to the mobile relay 3. Within the mobile relay 3 these RRC messages are received by the PHY layer of the second protocol stack 14 and passed up to the RRC layer of the second protocol stack 14. The RRC message is then transferred to the MRAP of the first protocol stack 13.

It is possible, that the RRC-layer of the second protocol stack 14 checks, whether the RRC messages is valuable for the mobile client 1. The RRC layer could for instance decide, that RRC messages related to adjusting the transmission power would not be useful for the mobile client 1, since the mobile client 1 does not communicate with the cellular network 4 directly. In this case, the RRC layer in the mobile relay will terminate at least a part of the RRC message and transfer the remaining part of the RRC message (if any) to the MRAP of the first protocol stack 13.

If the RRC message or a part of the RRC message is transferred to the MRAP of the first protocol stack 13, the MRAP encapsulates the RRC-message into a MRAP message and transmits it to the mobile client 1. In the mobile client 1 the RRC message is then received by the MRAP of the first protocol stack 11, deencapsulated and transferred to the RRC layer of the second protocol stack 12, where the RRC message will be processed.

User Data from Mobile Client 1 to Cellular Network 4:

Typically, user data are generated within the mobile client 1 in higher layers of the second protocol stack 12 of the mobile client 1, that are not shown in FIG. 1. These data comprise packet-switched data and/or circuit-switched data and are passed from the higher layers of the second protocol stack 12 to the RLC-layer and sent within a logical channel. If the logical channel does not use the transparent mode but either the acknowledged mode or the unacknowledged mode, the RLC-layer ciphers the data and sends the ciphered data to the MAC-d layer. In case that the logical channel does use the transparent mode, the data are not ciphered by the RLC-layer. Instead, they are passed to and are ciphered by the MAC-d layer. Depending on the transport channel the data belong to, the data are passed from the MAC-d layer to the CCH FP, the HS-DSCH FP, or the DCH FP and transmitted via the ad-hoc network 2 towards the corresponding layer of the first protocol stack 13 of the mobile relay 3. The different FPs make use of the underlying L2/L1 protocols of the specific ad-hoc technology used for the transmission across the ad-hoc network.

According to the layer (CCH FP, HS-DSCH FP, or DCH FP) of the set of lower layers 13L that receives the data from the mobile client 1, the data are then transferred to corresponding layers (MAC-s/sh, MAC-hs, or Macrodiversity; S/C) of the set of lower layers 14L of the second protocol stack 14. If the data are ciphered, they are not deciphered by any layer of the first protocol stack 13 or the second protocol stack 14. Instead, they are passed to the PHY-layer and thus transmitted via the air interface to the Node B and then forwarded to the RNC, where the data can then be deciphered by the cellular network.

User Data from Cellular Network 4 to Mobile Client 1 or to Mobile Relay 3:

The mobile relay 3 receives ciphered data dedicated to the mobile client 1 through the PHY-layer of the second protocol stack 14. According to the transport channel, the received data belong to, the data are passed to the corresponding layers (MAC-s/sh, MAC-hs, or Macrodiversity; S/C) of the set of lower layers 14L of the second protocol stack 14. Since data dedicated to the mobile client 1 and data dedicated to the mobile relay 3 itself are both received by the same instance of the second protocol stack 14, the layer (MAC-s/sh, MAC-hs, or Macrodiversity; S/C) the received data are passed to determines, whether these data are dedicated to the mobile relay 3 itself or whether they are dedicated to the mobile client 1. If the data are dedicated to the mobile relay 3 itself, the data are passed up the protocol stack 14 as it is usually done when a mobile terminal is connected to the cellular network 4.

If the data are dedicated to the mobile client 1, the data are transferred to the corresponding layer (CCH FP, HS-DSCH FP, or DCH FP) of the set of lower layers 13L of the first protocol stack 13. Again, if these data are ciphered, they will not be deciphered by the mobile relay 3. The data are transmitted via the ad-hoc network 2 to the corresponding layer of the set of lower layers 11L of the first protocol stack 11 of the mobile client 1. Here, they are transformed and then transferred to the MAC-d layer of the higher set of layers 12H of the second protocol stack 12 as shown by the arrows in FIG. 3. From there on, the data are processed by the remaining layers according to the UMTS-standard.

The examples of data flow described above show, that data transmitted from the cellular network 4 to the mobile relay 3 are examined by a layer of the set of lower layers 14L to detect, whether these data are dedicated to the mobile relay 3 itself or whether they are dedicated to the mobile client 1. In the first case, the data are passed up the second protocol stack 14 from the lower layers 14L up to the higher layers 14H.

If the data are dedicated to the mobile client 1 (e.g. ciphered user data), the mobile relay 3 transfers the data from at least one lower layer (MAC-s/sh, MAC-hs, or Macrodiversity; S/C) of the second protocol stack 14 to at least on lower layer (CCH FP, HS-DSCH FP, or DCH FP) of the first protocol stack 13 and then transmits the data to the mobile client 1. In the mobile client 1 the data are received by at least one lower layer (CCH FP, HS-DSCH FP, or DCH FP) of the first protocol stack 11 and transferred to a higher layer (MAC-d) of the second protocol stack 12. This means in particular, that the lower layers (MAC-s/sh, MAC-hs, or Macrodiversity; S/C) are terminated in the mobile relay 3 already and that the boundary 15 that subdivides each protocol stack 11, 12, 13, 14 in a set of higher layers 11H, 12H, 13H, 14H and a set of lower layers 11L, 12L, 13L, 14L is designed such that ciphered data are relayed by the mobile relay 3 without being deciphered by the mobile relay 3.

If the data that are received by the mobile relay 3 from the cellular network 4 are a RRC message, these data are passed up to the higher layers (MAC-d, RLC, RRC) of the second protocol stack 14. The RRC layer processes these data and/or causes the data to be transmitted to the RRC layer of the second protocol stack 12 of the mobile client 1 via the MRAP-layer of the first protocol stack 13, the ad-hoc network 2, and the MRAP-layer of the first protocol stack 11.

Such a method of the present invention for transmitting data between a mobile client and a cellular network may be performed using a computer program that can be run on a micro-processor, in particular on a mobile client and/or a mobile relay. The computer program may be stored on a memory element, in particular a random access memory, a read only memory or a flash memory. Furthermore, the computer program may also be stored on a compact disc, a digital versatile disc or a hard disc.

The examples shown above are predominantly related to the UMTS-standard. But it is emphasized, that the invention also works with different types of cellular networks 4, e.g. GSM or DECT and with different types of ad-hoc networks 2, e.g. Bluetooth, WLAN, or DECT.

Moreover, the invention is not bound to the examples given above. It is possible to replace some or all of the layers shown in FIG. 3 by other layers, to remove layers, and/or to add layers according to special needs and/or to the specification of the cellular network 4 and the ad-hoc network 2 that are used in conjunction with the invention.

The invention claimed is:

1. A method for transmitting data between a mobile client and a cellular network, wherein the mobile client is connected to an ad-hoc network and communicates via the ad-hoc network with a mobile relay that is connected to the ad-hoc network and the cellular network and wherein the mobile relay relays data that are transmitted from the mobile client towards the cellular network and/or data that are transmitted from the cellular network towards the mobile client wherein
the cellular network transmits data dedicated to the mobile relay and dedicated to the mobile client within the same data stream;
the mobile relay detects whether data received by the mobile relay contains data that are dedicated to the mobile relay itself and terminates the part of the received data that is dedicated to the mobile relay itself;
the mobile relay detects whether data received by the mobile relay contains data that are dedicated to the mobile client and forwards the part that is dedicated to the mobile client to the mobile client; and
the mobile relay detects whether data received by the mobile relay contains data that are dedicated to the cellular network and forwards the part that is dedicated to the cellular network to the cellular network.

2. The method of claim 1, wherein
the data transmitted between the mobile client and the mobile relay are processed by at least one layer of a first protocol stack of the mobile relay;
the data transmitted between the mobile relay and the cellular network are processed by at least one layer of a second protocol stack of the mobile relay; and
the detection whether data received from the cellular network by the mobile relay are dedicated to the mobile relay itself or are dedicated to the mobile client is performed by at least one lower layer of the second protocol stack;
wherein the first protocol stack and the second protocol stack comprise a set of lower layers and a set of higher layers.

3. The method of claim 2, wherein the detection whether data received from the mobile client by the mobile relay are dedicated to the mobile relay itself or are dedicated to the cellular network is performed by at least one lower layer of the first protocol stack of the mobile relay.

4. The method of claim 2, wherein
the termination of the data that are transmitted from the cellular network to the mobile relay and are dedicated to the mobile relay itself is performed by at least one higher layer of the second protocol stack of the mobile relay and/or
that the termination of the data that are transmitted from the mobile client to the mobile relay and are dedicated to the mobile relay itself is performed by at least one higher layer of the first protocol stack of the mobile relay.

5. The method of claim 2, wherein
the data that are transmitted from the cellular network to the mobile relay and are to be forwarded to the mobile client are transferred from at least one lower layer of the second protocol stack to at least one lower layer of the first protocol stack of the mobile relay and/or
that the data that are transmitted from the mobile client to the mobile relay and are to be forwarded to the cellular network are transferred from at least one lower layer of the first protocol stack to at least one lower layer of the second protocol stack of the mobile relay.

6. The method of claim 2, wherein the set of lower layers and the set of higher layers of the first protocol stack and/or the set of lower layers and the set of higher layers of the second protocol stack of the mobile relay are separated by a predefined boundary.

7. The method of claim 2, wherein the mobile client comprises at least a first protocol stack comprising a set of lower layers and a set of higher layers, wherein signaling between the mobile client and the mobile relay is performed by at least one higher layer of the first protocol stack of the mobile client and at least one higher layer of the first protocol stack of the mobile relay.

8. The method of claim 2, wherein
a ciphering of data that are transmitted from the mobile client to the cellular network is performed by at least a higher layer of the second protocol stack of the mobile client and
ciphered data that are received by the mobile relay from the mobile client are transferred from a lower layer of the first protocol stack of the mobile relay to a lower layer of the second protocol stack of the mobile relay.

9. The method of claim 2, wherein
ciphered data that are received by the mobile relay from the cellular network and are dedicated to the mobile client are transferred from a lower layer of the second protocol stack of the mobile relay to a lower layer of the first protocol stack of the mobile relay; and
a deciphering of ciphered data that are transmitted from the cellular network to the mobile client via the mobile relay is performed by a higher layer of the second protocol stack of the mobile client.

10. A telecommunications system adapted to execute a method according to claim 1, the telecommunications system comprising a cellular network, an ad-hoc network, a mobile client and a mobile relay, wherein the mobile client is connected to the ad-hoc network and comprises means for communicating with the mobile relay via the ad-hoc network, and wherein the mobile relay is connected to the ad-hoc network and the cellular network and comprises means to relay data that are transmitted from the mobile client to the cellular network and/or data are transmitted from the cellular network to the mobile client wherein the mobile relay is adapted
to detect whether data received by the mobile relay contains data that are dedicated to the mobile relay itself;
to terminate the part of the received data that is dedicated to the mobile relay itself;
to detect whether data received by the mobile relay contains data that are dedicated to the mobile client;
to forward the part that is dedicated to the mobile client to the mobile client;
to detect whether data received by the mobile relay contains data that are dedicated to the cellular network; and
to forward the part that is dedicated to the cellular network to the cellular network;

and the mobile client is adapted
to transmit data to a mobile relay that are dedicated to a cellular network and
to receive and process data that are transmitted from the cellular network to the mobile relay, dedicated to the mobile client, and forwarded by the mobile relay to the mobile client.

11. A mobile relay for relaying data that are transmitted from a mobile client to a cellular network and/or for relaying data that are transmitted from a cellular network to a mobile client wherein the mobile client is connected to the ad-hoc network and the mobile relay is connected to the ad-hoc network and to the cellular network wherein
The mobile relay comprises a first protocol stack for processing the data transmitted between the mobile relay and the mobile client;
the mobile relay comprises a second protocol stack for processing the data transmitted between the mobile relay and the cellular network;
the mobile relay is adapted to detect whether data received by the mobile relay contains data that are dedicated to the mobile relay itself;
the mobile relay is adapted to terminate the part of the received data that is dedicated to the mobile relay itself;
the mobile relay is adapted to detect whether data received by the mobile relay contains data that are dedicated to the mobile client;
the mobile relay is adapted to forward the part that is dedicated to the mobile client to the mobile client;
the mobile relay is adapted to detect whether data received by the mobile relay contains data that are dedicated to the cellular network; and
the mobile relay is adapted to forward the part that is dedicated to the cellular network to the cellular network.

12. The mobile relay of claim 11 wherein the first protocol stack and/or the second protocol stack comprises a set of lower layers and a set of higher layers and that the set of lower layers and the set of higher layers of each of both protocol stacks are separated by a predefined boundary.

13. The mobile relay of claim 12, wherein
at least one lower layer of the second protocol stack is adapted to detect whether part of the data received from the cellular network is dedicated to the mobile relay itself or whether it has to be forwarded to the mobile client; and/or
at least one lower layer of the first protocol stack is adapted to detect whether part of the data received from the mobile client is dedicated to the mobile relay itself or whether it has to be forwarded to the cellular network.

14. The mobile relay of claim 11, wherein
at least one higher layer of the second protocol stack is adapted to terminate part of the data that are received from the cellular network and are dedicated to the mobile relay itself; and/or
at least one higher layer of the first protocol stack is adapted to terminate part of the data that are received from the mobile client and are dedicated to the mobile relay itself.

15. The mobile relay of claim 11, wherein
ciphered data that are received from the mobile client by the mobile relay and are dedicated to the cellular network are transferred from at least one lower layer of the first protocol stack of the mobile relay to at least one lower layer of the second protocol stack of the mobile relay; and/or
ciphered data that are received from the cellular network by the mobile relay are transferred from at least one lower layer of the second protocol stack of the mobile relay to at least one lower layer of the first protocol stack of the mobile relay.

16. The mobile relay of claim 11, wherein the set of lower layers of the second protocol stack comprises a physical layer and at least one sub-layer of a data link layer.

17. The mobile relay of claim 11, wherein the set of higher layers of the second protocol stack comprises a RLC layer and/or a MAC-d layer.

18. A telecommunications system comprising a mobile relay according to claim 11, a cellular network, an ad-hoc network and a mobile client, wherein the mobile client is connected to the ad-hoc network and comprises means for communicating with the mobile relay via the ad-hoc network, and wherein the mobile relay is connected to the ad-hoc network and the cellular network and comprises means to relay data that are transmitted from the mobile client to the cellular network and/or data are transmitted from the cellular network to the mobile client wherein the mobile relay is adapted
- to detect whether data received by the mobile relay contains data that are dedicated to the mobile relay itself;
- to terminate the part of the received data that is dedicated to the mobile relay itself;
- to detect whether data received by the mobile relay contains data that are dedicated to the mobile client;
- to forward the part that is dedicated to the mobile client to the mobile client;
- to detect whether data received by the mobile relay contains data that are dedicated to the cellular network; and
- to forward the part that is dedicated to the cellular network to the cellular network;

and the mobile client is adapted
- to transmit data to a mobile relay that are dedicated to a cellular network and
- to receive and process data that are transmitted from the cellular network to the mobile relay, dedicated to the mobile client, and forwarded by the mobile relay to the mobile client.

19. A mobile client connected to an ad-hoc network, wherein the mobile client is adapted to
transmit data to a mobile relay that are dedicated to a cellular network and
to receive and process data that are transmitted from the cellular network to the mobile relay, dedicated to the mobile client, and forwarded by the mobile relay to the mobile client,
wherein the mobile client comprises a first protocol stack for sending and receiving data via the ad-hoc network and a second protocol stack for sending and receiving data via the cellular network, wherein the first protocol stack comprises a set of lower layers and a set of higher layers and the second protocol stack comprises at least a set of higher layers.

20. The mobile client of claim 19 wherein the mobile client is adapted to send and receive signaling related data to and from the mobile relay.

21. The mobile client of claim 19, wherein the set of lower layers and the set of higher layers of the first protocol stack are separated by a predefined boundary and each layer within the set of higher layers of the second protocol stack is above this boundary.

22. The mobile client of claim 19, wherein the higher layers of the second protocol stack comprise a RLC layer and/or a MAC-d layer.

23. The mobile client of claim 19, wherein the set of lower layers of the first protocol stack of the mobile client comprises standard ad-hoc network interface protocols.

24. The mobile client of claim 19, wherein the mobile client comprises different adaptation layers or Frame Protocols above the ad-hoc interface.

25. A Radio Access Network that is part of a cellular network and adapted to transmit data related to signaling, data dedicated to a mobile relay, and data dedicated to a mobile client, wherein the radio access network comprises a radio access network protocol stack and wherein the radio access network protocol stack comprises a set of lower layers and a set of higher layers wherein
- a first instance of higher layers of the radio access network protocol stack is used to process the data dedicated to the mobile relay;
- a second instance of higher layers of the radio access network protocol stack is used to process the data dedicated to the mobile client; and
- an instance of lower layers of the radio access network protocol stack is used to transmit the data to the mobile relay that are dedicated to the mobile relay and to the mobile client.

26. A telecommunications system comprising a radio access network according to claim 25, a cellular network, an ad-hoc network, a mobile client and a mobile relay, wherein the mobile client is connected to the ad-hoc network and comprises means for communicating with the mobile relay via the ad-hoc network, and wherein the mobile relay is connected to the ad-hoc network and the cellular network and comprises means to relay data that are transmitted from the mobile client to the cellular network and/or data are transmitted from the cellular network to the mobile client wherein the mobile relay is adapted
- to detect whether data received by the mobile relay contains data that are dedicated to the mobile relay itself;
- to terminate the part of the received data that is dedicated to the mobile relay itself;
- to detect whether data received by the mobile relay contains data that are dedicated to the mobile client;
- to forward the part that is dedicated to the mobile client to the mobile client;
- to detect whether data received by the mobile relay contains data that are dedicated to the cellular network; and
- to forward the part that is dedicated to the cellular network to the cellular network;

and the mobile client is adapted
- to transmit data to a mobile relay that are dedicated to a cellular network and
- to receive and process data that are transmitted from the cellular network to the mobile relay, dedicated to the mobile client, and forwarded by the mobile relay to the mobile client.

27. A telecommunications system comprising a cellular network, an ad-hoc network, a mobile client and a mobile relay wherein the mobile client is connected to the ad-hoc network and comprises means for communicating with the mobile relay via the ad-hoc network, and wherein the mobile relay is connected to the ad-hoc network and the cellular network and comprises means to relay data that are transmitted from the mobile client to the cellular network and/or data are transmitted from the cellular network to the mobile client wherein the mobile relay is adapted
- to detect whether data received by the mobile relay contains data that are dedicated to the mobile relay itself;
- to terminate the part of the received data that is dedicated to the mobile relay itself;

to detect whether data received by the mobile relay contains data that are dedicated to the mobile client;

to forward the part that is dedicated to the mobile client to the mobile client;

to detect whether data received by the mobile relay contains data that are dedicated to the cellular network; and to forward the part that is dedicated to the cellular network to the cellular network;

and the mobile client is adapted to transmit data to a mobile relay that are dedicated to a cellular network and to receive and process data that are transmitted from the cellular network to the mobile relay, dedicated to the mobile client, and forwarded by the mobile relay to the mobile client.

28. A telecommunications system comprising a mobile client, a cellular network, an ad-hoc network and a mobile relay, wherein the mobile client is adapted to transmit data to a mobile relay that is dedicated to a cellular network and to receive and process data that are transmitted from the cellular network to the mobile relay, dedicated to the mobile client, and forwarded by the mobile relay to the mobile client, and wherein the mobile client is connected to the ad-hoc network and comprises means for communicating with the mobile relay via the ad-hoc network, and wherein the mobile relay is connected to the ad-hoc network and the cellular network and comprises means to relay data that are transmitted from the mobile client to the cellular network and/or data are transmitted from the cellular network to the mobile client wherein the mobile relay is adapted to detect whether data received by the mobile relay contains data that are dedicated to the mobile relay itself;

to terminate the part of the received data that is dedicated to the mobile relay itself;

to detect whether data received by the mobile relay contains data that are dedicated to the mobile client;

to forward the part that is dedicated to the mobile client to the mobile client;

to detect whether data received by the mobile relay contains data that are dedicated to the cellular network; and to forward the part that is dedicated to the cellular network to the cellular network;

and the mobile client is adapted to transmit data to a mobile relay that are dedicated to a cellular network and to receive and process data that are transmitted from the cellular network to the mobile relay, dedicated to the mobile client, and forwarded by the mobile relay to the mobile client.

29. A computer-readable medium with a computer program embodied thereon that can be run on a micro-processor, in particular on a mobile client and/or a mobile relay, wherein that the computer program is programmed to perform a transmission of data between a mobile client and a cellular network, if the computer program is run on the micro-processor, wherein the mobile client is connected to an ad-hoc network and communicates via the ad-hoc network with a mobile relay that is connected to the ad-hoc network and the cellular network and wherein the mobile relay relays data that are transmitted from the mobile client towards the cellular network and/or data that are transmitted from the cellular network towards the mobile client wherein the cellular network transmits data dedicated to the mobile relay and dedicated to the mobile client within the same data stream;

the mobile relay detects whether data received by the mobile relay contains data that are dedicated to the mobile relay itself and terminates the part of the received data that is dedicated to the mobile relay itself;

the mobile relay detects whether data received by the mobile relay contains data that are dedicated to the mobile client and forwards the part that is dedicated to the mobile client to the mobile client; and the mobile relay detects whether data received by the mobile relay contains data that are dedicated to the cellular network and forwards the part that is dedicated to the cellular network to the cellular network.

30. The computer-readable medium of claim 29, wherein the computer program is stored on a memory element, in particular a random access memory, a read only memory or a flash memory.

31. The computer-readable medium of claim 29, wherein the computer program is stored on a compact disc, a digital versatile disc or a hard disc.

* * * * *